Figure 3:
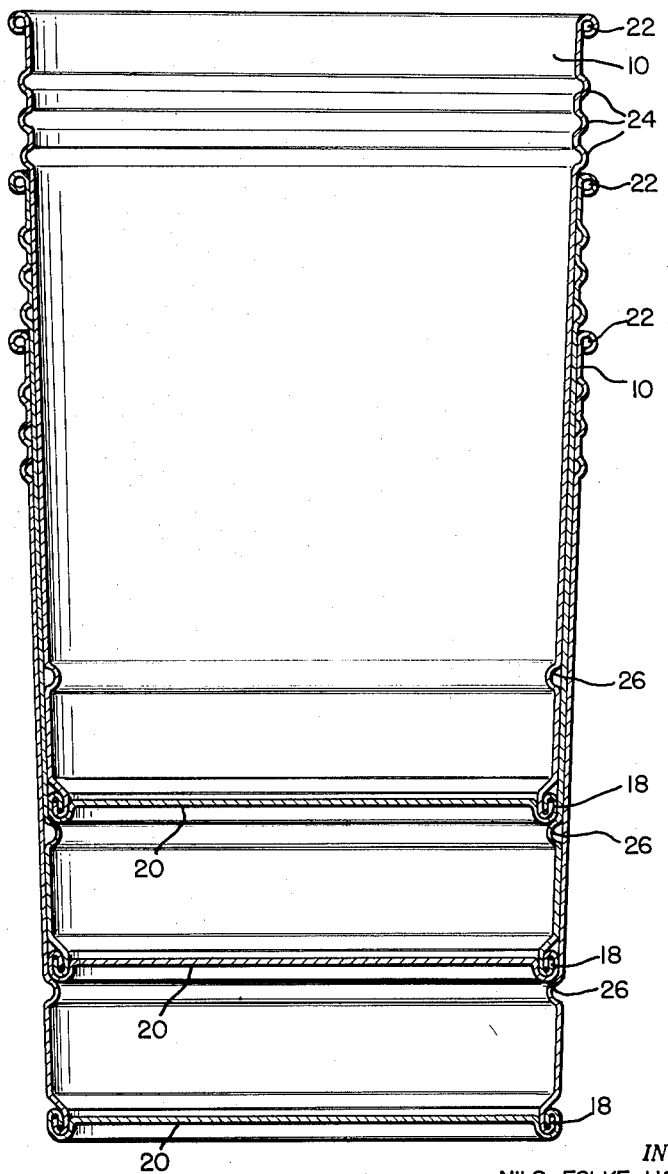

Sept. 21, 1965    NILS-FOLKE HAMMARGREN ETAL    3,207,109
PROCESS OF MANUFACTURING PORTABLE RECEPTACLES
Original Filed Feb. 13, 1961            3 Sheets-Sheet 1
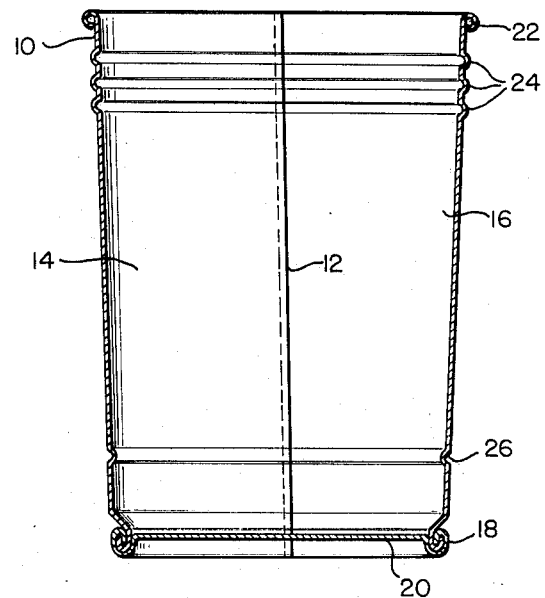
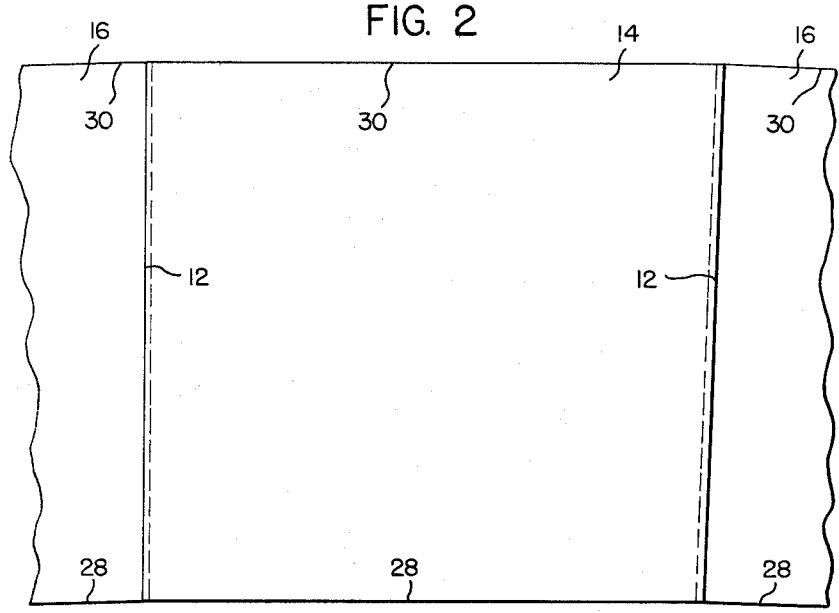
INVENTORS
NILS FOLKE HAMMARGREN
AND
LARS JOHAN HAMMARGREN
BY
Attorney Sept. 21, 1965    NILS-FOLKE HAMMARGREN ETAL    3,207,109
PROCESS OF MANUFACTURING PORTABLE RECEPTACLES
Original Filed Feb. 13, 1961                           3 Sheets-Sheet 3

INVENTORS
NILS FOLKE HAMMARGREN
AND
BY LARS JOHAN HAMMARGREN

Attorney

United States Patent Office 3,207,109
Patented Sept. 21, 1965

3,207,109
PROCESS OF MANUFACTURING PORTABLE RECEPTACLES
Nils-Folke Hammargren, 4 Tetorpsvagen, and Lars Johan Hammargren, 24 Vasbyvagen, both of Upplands Vasby, Sweden
Original application Feb. 13, 1961, Ser. No. 88,911. Divided and this application Mar. 26, 1963, Ser. No. 274,888
3 Claims. (Cl. 113—120)

The present invention relates to a process for manufacturing portable receptacles for transporting goods, and more particularly to nestable, portable receptacles of inverted truncated-conical shape, each having its side wall made by interlocking two metal sheets, and each having a generally flat bottom interlocked to its side wall sheets. In a more specific aspect the present application is a division of our copending U.S. patent application, Serial No. 88,911, filed February 13, 1961, and now abandoned; and relates to an improved process for manufacturing a sheet metal receptacle of the type disclosed in our copending U.S. patent application Serial No. 796,168, now abandoned, of which the application Serial No. 88,911 was a continuation-in-part. These receptacles will hereinafter be called "transport receptacles."

In producing receptacles of the type described, which are intended to be stacked or nested in one another, the two sheet metal panels, which are used to make the side wall or truncated-conical portion of each receptacle, have hitherto been formed from a flat circular disc by cutting the disc diametrally, and using one punch and die set to cut the outer circular edges of the two sheets, and a second punch and die set to cut the inner circular edges of the two sheets. The inner edges of the two sheets form the narrow end of the receptacle while the outer circular edges form the wide end thereof when the two sheets are bent arcuately and interlocked. As will be appreciated for different heights of receptacles the radii of the inner and outer arcuate edges of the sheets vary. Accordingly, this means that different tools must be provided for each change in height of the receptacle. This, of course, involves heavy costs for the manufacturer. In addition, the described manufacturing process produces an uneconomical waste of material since the scrap material from the blanks normally is of such shape that in most cases it cannot be used for other purposes.

One object of the present invention is to provide an improved process for manufacturing sheet metal, truncated-conical receptacles and an improved structure therefor which will obviate the disadvantages of prior methods of manufacturing such receptacles without eliminating the stackability of the receptacles.

A more specific object of the invention is to provide a process whereby sheet metal, truncated-conically shaped receptacles may be constructed from approximately rectangular blanks with a minimum of cutting and resultant waste, and wherein the peripheral wall of the receptacle has such a small conicity that the lower edge thereof may be secured to a bottom plate by an ordinary bottom folding machine in spite of the fact that the edges of the sheets from which the peripheral wall of the receptacle is formed are straight.

Another object of this invention is to provide the truncated-conical receptacle of the character described which has shoulders thereon to prevent the binding of receptacles when one is placed within another.

Other objects of the invention will be apparent hereinafter from the specification and from the recital of the appended claims particularly when read in conjunction with the accompanying drawings.

Figure 4:
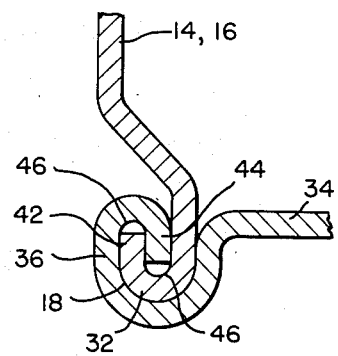
Figure 5:
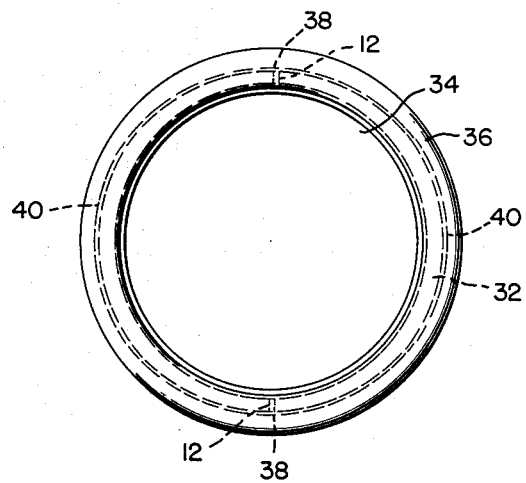

In the drawings:
FIG. 1 is an axial sectional view of a transport receptacle made according to one embodiment of this invention;
FIG. 2 is an elevational view showing the peripheral wall of the receptacle laid out in a plane;
FIG. 3 is an axial sectional view on a larger scale showing a number of these receptacles nested in one another;
FIG. 4 is a fragmentary enlarged axial sectional view showing the interlocked fold of the side wall of the receptacle with its bottom; and
FIG. 5 is a bottom plan view of the receptacle showing its bottom plate inserted in its side wall but before being interlocked with the latter.

Referring now to the drawing by numerals of reference, 10 denotes generally a transport receptacle whose peripheral or lateral wall is composed of two sheets or panels 14, 16 of sheet metal which are joined together at their lateral edges by means, for example, of welds 12. The peripheral or lateral wall of the receptacle has a slight downward taper which results from the fact that one of the lateral edges of each panel is inclined at an angle of at most 6° to 10° to the other. At its lower end it is secured to a flat bottom plate 20 in known manner by means of an interlocked fold 18. In addition, at its top the container is provided with a rolled flange 22. The peripheral wall is further provided with three outwardly projecting reinforcing grooves 24, the uppermost of which is spaced slightly below the top flange 22 of the receptacle. Also, the side wall of the receptacle is provided with an inwardly projecting groove 26 which is spaced slightly above bottom fold 18. This groove 26 may to advantage be spaced above the fold 18 about one-fifth the total height of the receptacle.

By forming the receptacle in this way, as will be seen from FIG. 3, several receptacles may be nested into one another until the bottom fold 18 of one receptacle rests on the lower groove 26 of the next lowest receptacle. With the conicity above stated, and with the lower groove 26 located at the approximate distance from the bottom stated above, the receptacles show no tendency to stick to each other but may readily be separated. As will be appreciated this possibility of nesting the receptacles in one another permits considerable saving of space when storing empty receptacles as well as when transporting them.

According to the invention the sheets or panels 14 and 16 are made with straight bottom edges 28, and the bottom fold 18 takes place along these edges. By forming the sheets or panels with the above-stated conicity, it is possible to produce the fold 18 on a conventional bottom folding machine and still obtain a receptacle which is completely tight at its bottom.

The top edge 30 of each sheet or panel may be made parallel to the bottom edge 28 thereof; and in that case the receptacle may be produced in a combined bottom folding machine and roll-flanging apparatus in order that the rolled top flange 28 may be produced at the same time as the bottom fold 18.

To produce a receptacle according to the invention, a square rectangular blank of sheet metal may be cut from top to bottom along a straight line inclined at an angle of at most 6° to 10° to the top and bottom edges of the blank. Each half of the blank will then look like the panel 14 of FIG. 2. The two panels so formed are then rolled into approximately semi-cylindrical shape. One of the resultant panels is then turned over, and the cut edge of each panel is then welded at 12 with a uniform overlap or in abutment, if preferred, to the opposite edge of the other panel, so that a conical peripheral wall is formed for the receptacle.

The next step in production is the formation of grooves 24 and 26 (FIGS. 1 and 3) in the wall of the receptacle in known manner, and the forming, also in known manner, of the upper and lower flanges 22 and 32. These flanges extend approximately in planes perpendicular to the axis of the peripheral wall of the receptacle. In the bottom end of the peripheral wall there is then positioned a circular bottom plate 34 having an outwardly-extending ring flange 36 which is wider than flange 32 and which engages this flange upon insertion of the bottom in the peripheral wall. The assembly is then introduced into a bottom folding machine, and the flanges 32, 36 are folded so as to interlock one another, as shown in FIG. 4. Here the flange 36 is bent downwardly upon itself so that it finally has two 180° bends and an inside arcuate portion 44 which lies inside the outer arcuate portion 42 of panel 14 or 16, as the case may be, so that portion 42 of a side panel 14 or 16 is locked between portions 36 and 44 of the bottom plate.

Because the sheets 14 and 16 when laid out in a plane (FIG. 2) are straight along their bottom edges 28, the bottom flange 32, when formed, will have a continuously varying width, as illustrated in FIG. 5. From the two diametrically opposite points 38, where the seams 12 are located, the width of the annular flange 32 increases to a maximum at those two diametrically opposite points 40 which are displaced 90° from the point 38.

During the bottom folding in an ordinary bottom folding machine, this variation in the width of flange 32 causes a corresponding variation in the axial length of engagement or overlap between the two terminal or peripheral portions 42 and 44 of the flanges 32 and 36, respectively of the finished fold joint. This overlap must always occur in the fold joint in order for this to be tight, but on the other hand it must not be so large that the extremities of the respective portions 42, 44 touch the bottoms 46 of each other's folds, since then the folding machine will not be able to make the folds. As will be appreciated, determining factors are the conicity of the peripheral wall, and therefore the varying width of the flange 32, in relation to the width of the flange 36 of the bottom member. Hence, the primary problem solved by the present invention is that of establishing a conicity which by use of panels of the type described above permits a perfect bottom fold to be made in an ordinary folding machine. Moreover this has been achieved while simplifying and cheapening the production of the panels. Through the method of production and through the structure described, a great saving in space in stacking of receptacles in one another is made possible, the grooves in the peripheral wall preventing binding while still allowing the small conicity.

In this respect, it should be noted that the outer diameter of fold 18 is less than the inner diameter of the peripheral wall of each receptacle immediately above the shoulder 26, but greater than the inner diameter of the shoulder 26. One receptacle may thus be inserted within another, the extent of its insertion being limited by its fold 18 coming to rest against the inner peripheral shoulder 26 of the receptacle into which it is inserted. At the same time, the lowermost of the external shoulders 24 adjacent the upper end of the inserted receptacle comes to rest against the flanged upper edge 22 of the receiving receptacle. Hence, the grooved portions 24 and 26, in addition to providing reinforcing means for the receptacle, provide shoulders that serve to limit insertion of one receptacle into another and prevent binding between the receptacles when they are nested as illustrated in FIG. 3.

As a result of having cut wall panels 14 and 16 in accordance with the foregoing disclosure, the waste of material has been considerably reduced and the number of steps involved in producing the truncated-conical wall have been minimized compared to conventional methods.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described our invention, what we claim is:

1. The process of producing nestable receptacles that are of inverted truncated-conical shape comprising the steps of severing a rectangular blank of sheet metal in half along a line extending between its upper and lower edges and inclined slightly to said edges to provide two panels, rolling the panels into approximately semi-cylindrical shape, inverting one of said panels, and securing the severed side edge of each of the two panels to, and parallel with, the opposite edge of the other panel to define a peripheral wall of inverted, truncated-conical configuration, forming an outwardly-projecting annular groove and an inwardly-projecting annular groove in said wall, the outwardly-projecting groove providing an external shoulder spaced below the upper wide end of said wall and the inwardly-projecting groove providing an internal shoulder spaced slightly above the lower, narrow end of said wall, forming a rolled flange around the upper edge of said wall and an annular, outwardly extending flange around the lower peripheral edge of said wall, inserting an embossed, circular disk in the lower end of said wall, the embossed portion of the disk fitting snugly in said lower end and the disk having a peripheral annular flange engaging and extending outwardly beyond the flange around the lower edge of said wall, and folding the annular flanges of said disk and of said wall on one another to interlock the lower end of the wall and said disk.

2. The process according to claim 1 wherein said rectangular blank is severed along a line which is inclined at most from 6° to 10° to the upper and lower edges of said blank.

3. The process of producing nestable receptacles that are of inverted truncated-conical shape comprising the steps of severing a rectangular blank of sheet metal in two along a line extending between its upper and lower edges, and inclined at an angle of, at most, 6° to 10° to its side edges to provide two panels, rolling the panels into approximately semi-cylindrical shape, inverting one of said panels, and securing the severed edge of each panel to, and parallel with, the opposite side edge of the other panel to define a peripheral wall of inverted, truncated-conical configuration, forming an inwardly-projecting annular groove in said wall to provide an internal shoulder spaced slightly above the lower end of said wall, forming an annular, outwardly extending flange around the lower peripheral edge of said wall, inserting a circular disk, which has a peripheral annular flange in the lower end of said wall, until the disk fits snugly in said lower end with the flange of the disk engaging and extending radially outwardly beyond the flange around the lower edge of said wall, and folding the flanges of said disk and of said wall on one another to interlock the lower end of the wall and said disk.

No references cited.

CHARLES W. LANHAM, *Primary Examiner.*